Patented Dec. 4, 1945

2,390,249

UNITED STATES PATENT OFFICE 2,390,249

INSECT-REPELLENT COMPOSITION

Stanley A. Hall, Mount Rainier, Md., and Bernard V. Travis and Howard A. Jones, Orlando, Fla., dedicated to the free use of the People in the territory of the United States No Drawing. Application September 14, 1945, Serial No. 616,444

4 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the People in the territory of the United States to take effect on the granting of a patent to us.

This invention relates to an improved composition for repelling insects, and has among its objects the provision of an effective and long-lasting insect-repellent composition that is safe for application to the skin and that does not harm objects made of plastic materials.

It has been found that certain esters of cinnamic acid show in varying degree the property of repelling insects. Both methyl cinnamate and ethyl cinnamate show moderate repellent properties against mosquitoes. Ethyl cinnamate is the better of these two as a repellent, but it is not suitable for application to the skin since it has been shown to be toxic when absorbed through the skin.

However, according to this invention, it has been discovered that isopropyl cinnamate is both an excellent insect repellent and entirely suitable for application to the skin as shown by toxicological tests on rabbits. It also possesses another unexpected and desirable property. Although ethyl cinnamate dissolves plastic substances, isopropyl cinnamate has been found to be a very poor solvent for plastic materials, such as commonly comprise buttons, fountain pens, and other articles that would normally be disfigured by contact with an insect repellent possessing plastic solvent properties.

Isopropyl cinnamate may be used to repel insects in numerous ways. For example, it may be applied to the exposed parts of the body or to clothing, either in the undiluted form or incorporated in a suitable solvent or other inert diluent. Such solvents as mineral oils, vegetable oils, and various alcohols are suitable. The isopropyl cinnamate may also be mixed with known insect repellent substances, such as dimethyl phthalate. By incorporating it in a suitable inert powder, the isopropyl cinnamate may be applied to the skin in the form of a paste or cream.

The composition of this invention has been tested by the usual method used in testing insect repellents. This was done by applying one-fourth teaspoonful of the material to be tested to the forearm from wrist to elbow and exposing the arm to a large number of hungry mosquitoes or other biting insects. The time elapsing to the first bite was recorded. This test gives results that are highly indicative of the value of a repellent in practical use. The results obtained by this test with undiluted isopropyl cinnamate and with this substance diluted with several inert diluents against Aedes aegypti and Anopheles quadrimaculatus mosquitoes are presented in the table.

Table

|  | Average repellent time to first bite, in minutes | |
|---|---|---|
|  | Aedes aegypti | Anopheles quadri maculatus |
| Isopropyl cinnamate (alone) | 245 | 234 |
| Isopropyl cinnamate 75%, mineral oil 25% | 273 | 143 |
| Isopropyl cinnamate 75%, olive oil 25% | 220 | 98 |
| Isopropyl cinnamate 75%, ethanol 25% | 300 | 163 |

The examples in the table are not to be construed as limiting the kinds of insects which this composition may be used to repel. It is effective in repelling other biting and annoying insects, such as Stomoxys calcitrans. Also, it may be applied to regions other than the skin for repellent purposes. For example, it may be applied to the clothing to prevent attachment of Trombicula sp. (chiggers).

In addition to those already mentioned, other cinnamic acid esters have also been investigated in the course of this study, and certain of them have been found to possess insect-repellent properties. Among these are n-propyl cinnamate, n-butyl cinnamate, sec-butyl cinnamate, isobutyl cinnamate, tert-butyl cinnamate, and cyclohexyl cinnamate.

Having thus described the invention, what is claimed is:

1. An insect-repellent composition comprising isopropyl cinnamate as an essential active ingredient incorporated in an inert diluent.

2. An insect-repellent composition comprising isopropyl cinnamate as an essential active ingredient dissolved in a vegetable oil.

3. An insect-repellent composition comprising isopropyl cinnamate as an essential active ingredient incorporated in an inert powder to form a paste.

4. A method of repelling insects comprising applying isopropyl cinnamate to the region from which the insects are to be repelled.

STANLEY A. HALL.
BERNARD V. TRAVIS.
HOWARD A. JONES.